3,122,473
METHOD OF REPELLING BEES WITH ACETIC AND PROPIONIC ACIDS
Jonathan W. White, Jr., Ambler, Pa., Clayton L. Farrar and Floyd E. Moeller, Madison, Wis., and Alan W. Woodrow, Tucson, Ariz., assignors to the United States of America as represented by the Secretary of Agriculture
No Drawing. Filed Feb. 27, 1962, Ser. No. 176,158
5 Claims. (Cl. 167—22)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to the harvesting or removal of honey from colonies of honeybees and has among its objectives the clearing of bees from the combs of honey to be removed from the hive.

It is common practice for the beekeeper to provide hive bodies containing combs for honey storage by the bees beyond that space provided in the brood nest. After these hive bodies (supers) are suitably filled with honey, they are removed by the beekeeper and the surplus honey therein removed for use. It is necessary that the bees in such supers be removed or driven out before the supers are taken from the hive.

The means previously used for this purpose, such as bee escapes and the use of smoke or other materials repellent to bees, all have deficiencies and shortcomings, particularly when considered by the larger-scale apiarist. Clearing of supers by bee escapes is a very slow process and requires at least two visits to an apiary to remove honey. The use of repellent materials avoids this necessity, but all repellents in use heretofore have specific disadvantages: they may be corrosive and offensive to the user, such as phenol; may be difficult to store and transport, such as Dry Ice; they may be too complex to permit easy assay of their presence in honey, such as pine oil. In addition, some of these materials, such as smoke and phenol may contaminate honey and lower its quality. Other deficiencies may occur due to greatly varying weather conditions. Such a material as phenol may be virtually useless in cool, cloudy weather. Furthermore, phenol is greatly irritating to the bees, which hampers the beekeeper as it is usually necessary for him to work with protective clothing when using this material. Phenol is also somewhat toxic and also is quite corrosive to the skin.

We have discovered that certain organic acids and derivatives thereof are bee repellents and may be used to drive bees from honey supers with none of the disadvantages listed above for other materials currently used commercially for this purpose.

In general according to the present invention bees are repelled by the method comprising introducing a lower saturated fatty aicd into the vicinity of the bees. Both acetic and propionic acid have been tested and been found to be efficient and useful for driving bees from supers preliminary to removing honey. Further, both these acids are generally recognized as non-toxic materials, being commonly constituents of various food materials.

Selection of propionic or acetic acid would depend to to considerable extent on weather conditions, with hotter weather favoring the less volatile propionic acid. Even with the lower volatility of propionic acid it may dissipate rapidly and require frequent renewal.

In a preferred embodiment of the present process the use of propionic anhydride diluted with water provides a slower release of propionic acid vapors, providing a more efficient and effective means of driving bees from the supers. Propionic anhydride, per se, is also repellent to bees.

Various means of introducing the lower saturated fatty acid into the vicinity of the bees may be employed. Typically, the repellent is diluted with water, applied to an absorbent material, where it volatilizes and circulates from the vicinity of the repellent source to the vicinity of the bees. The absorbent material, for example, a cloth pad or a piece of composition board, may be placed in the hive near the supers and the repellent allowed to volatilize. The acid may be allowed to circulate throughout the supers by natural air currents, or a means of enhancing circulation may be employed. Alternatively the absorbent material may be contained in an enclosure having an opening through which air is forced into the enclosure, and an exit opening which is adapted for attaching to a super.

The beekeeper may still find it preferable to use a smoker to gain access to the vicinity of the hive prior to introducing the repellent into the super, but smoke entering the super should be kept to a minimum to avoid contaminating the honey.

Practice of the invention is illustrated by the following examples.

*Example 1*

Commercial propionic acid was diluted with water to give a solution containing 25% propionic acid. Weather conditions: hot day, temperature in the upper 90's, with a light wind. The hive had three stories and contained a heavy colony of bees with good population in the third story. Smoke was used to gain access to the hive. A cloth pad was charged with 20 ml. of the 25% aqueous propionic acid solution and placed in the third story. After ten minutes the pad was removed and the combs lifted from this super. Bees remaining in the super averaged about ten per comb.

*Example 2*

Without recharging, the pad from Example 1 was taken to the next hive and placed in the top (third-story) super. This was a very heavy colony of bees, with many young bees and full combs of honey. The pad was removed after ten minutes. At this time there were only 5 to 12 bees per comb remaining. The pad appeared to need recharging.

In removing honey from 150 hives by the method of Examples 1 and 2, the bees were very quiet and not inclined to sting. The beekeeper's protective clothing could be removed.

*Example 3*

An aqueous solution containing 25% acetic acid in water was prepared from commercial acetic acid. A volume of 50 ml. of the solution was applied to a pad and placed in a super. Although the prevailing temperature was more moderate than the condition of Example 1, with the larger volume of the more volatile acid as the repellent only three minutes was necessary to clear most of the bees from the super.

It was found that two men could remove 25–30 supers of honey per hour using method of Example 3. Protective clothing was not needed.

*Example 4*

Equal volumes of propionic anhydride and water were mixed and about 30 ml. was applied to a pad in a special fume chamber. The fume chamber was placed over the top super and air was forced through the fume chamber and down into the super by pumping on a bee smoker bellows. Five or six air-blasts with the bellows was made to start the bees moving. After a pause, about half a minute, the bellows were operated again to keep the bees moving. Bees were cleared from shallow supers in one to one and one-half minutes, about half-a-minute more being required for the Langstroth depth supers.

When using propionic anhydride as shown in Example 4, many more supers can be removed from hives before renewing the material on the pad than was found necessary in procedures of Examples 1 or 3. Employing the procedure of Example 4, one man can remove 30 or more 12-frame shallow supers in one hour, and only one or two rechargings of the pad with the 50% propionic anhydride in water mixture is necessary when operating at this speed.

When propionic anhydride is used as the repellent, bees become gentle and easy to work with, an advantage noted in preceding examples. There is no indication of any detrimental effect upon the bees, and if the frames of honey are left on the hive after removal of the fume chamber, bees return to cover the combs in a matter of minutes.

Although it is probable that acetic anhydride could be employed in a manner analogous to Example 4 to provide a slower release of acetic acid fumes, the highly reactive, corrosive and dangerous nature of acetic anhydride would effectively prevent its common use for this purpose. On the contrary, propionic anhydride is much less reactive and does not appear to be corrosive and dangerous to handle.

Some beekeepers may find it to their advantage to use a mixture of the repellents.

There is no change noted in the flavor or odor of honey harvested by the method of the present invention.

We claim:

1. A method of repelling bees comprising introducing into the vicinity of the bees a material selected from the group consisting of acetic acid, propionic acid, propionic anhydride, and an aqueous solution thereof.

2. A method of clearing bees from a hive which comprises introducing into the hive a material selected from the group consisting of acetic acid, propionic acid, propionic anhydride, and an aqueous solution thereof.

3. The method of claim 2 in which the material is acetic acid.

4. The method of claim 2 in which the material is propionic acid.

5. The method of claim 2 in which the material is propionic anhydride.

References Cited in the file of this patent

Dethier: Chemical Insect Attractants and Repellants, published by Blakiston Co., Philadelphia, Pa., 1947, page 219.

King: Chemicals Evaluated as Insecticides, U.S.D.A. Handbook No. 69, issued May 1954, pp. 26 and 285.

American Bee Journal, vol. 101, No. 9, September 1961, pp. 356 and 369; vol. 101, No. 11, November 1961, pp. 432–3; vol. 102, No. 6, June 1962, pp. 216–218.